US012669467B2

(12) United States Patent
Jung et al.

(10) Patent No.: US 12,669,467 B2
(45) Date of Patent: Jun. 30, 2026

(54) DIELECTROPHORESIS-BASED DYNAMIC SERS NANOELEMENT FOR CLASSIFICATION AND ANALYSIS OF METABOLITES

(71) Applicants: Korea Advanced Institute of Science and Technology, Daejeon (KR); Samsung Life Public Welfare Foundation, Seoul (KR)

(72) Inventors: Yeonsik Jung, Daejeon (KR); Minjae Ku, Daejeon (KR); Seunghee Cho, Daejeon (KR); Hyungjoon Park, Daejeon (KR); Minjoon Kim, Daejeon (KR); Min Young Lee, Seoul (KR)

(73) Assignees: KOREA ADVANCED INSTITUTE OF SCIENCE AND TECHNOLOGY, Daejeon (KR); SAMSUNG LIFE PUBLIC WELFARE FOUNDATION, Seoul (KR)

( * ) Notice: Subject to any disclaimer, the term of this patent is extended or adjusted under 35 U.S.C. 154(b) by 7 days.

(21) Appl. No.: 18/288,116

(22) PCT Filed: Nov. 17, 2022

(86) PCT No.: PCT/KR2022/018187
§ 371 (c)(1),
(2) Date: Oct. 24, 2023

(87) PCT Pub. No.: WO2023/090890
PCT Pub. Date: May 25, 2023

(65) Prior Publication Data
US 2024/0288402 A1 Aug. 29, 2024

(30) Foreign Application Priority Data
Nov. 17, 2021 (KR) ........................ 10-2021-0158871

(51) Int. Cl.
*G01N 27/447* (2006.01)
*B03C 5/00* (2006.01)
(Continued)

(52) U.S. Cl.
CPC ....... *G01N 27/44704* (2013.01); *B03C 5/005* (2013.01); *B03C 5/022* (2013.01); *G01N 21/658* (2013.01); *B03C 2201/26* (2013.01)

(58) Field of Classification Search
CPC ........... G01N 27/44704; G01N 21/658; G01N 33/483; G01N 21/66; B03C 5/005;
(Continued)

(56) References Cited

U.S. PATENT DOCUMENTS

2006/0240401 A1* 10/2006 Clarke ................... G01N 33/52
600/317
2007/0153267 A1* 7/2007 Wang ................... G01N 21/648
356/301
(Continued)

FOREIGN PATENT DOCUMENTS

KR 101259355 B1 4/2013
KR 101761010 B1 7/2017
(Continued)

OTHER PUBLICATIONS

Ertsgaard et al. "Integrated Nanogap Platform for Sub-Volt Dielectrophoretic Trapping and Real-Time Raman Imaging of Biological Nanoparticles." Nano letters vol. 18,9 (2018): 5946-5953, doi:10.1021/acs.nanolett.8b02654 (Year: 2018).*
(Continued)

*Primary Examiner* — Tarifur R Chowdhury
*Assistant Examiner* — Akbar H. Rizvi
(74) *Attorney, Agent, or Firm* — ArentFox Schiff LLP; Joseph M. Maraia

(57) ABSTRACT
Provided is a dielectrophoresis-based dynamic Surface-Enhanced Raman Spectroscopy (SERS) nanoelement for the
(Continued)

classification and analysis of metabolites. A method for analyzing metabolites using a dielectrophoresis-based dynamic SERS nanoelement according to an embodiment of the present invention may comprise the steps of: preparing a dynamic SERS nanoelement in which a surface region is formed as an array; applying voltage to the dynamic SERS nanoelement; and classifying the metabolites of an analysis subject according to region by controlling the polarity of the dynamic SERS nanoelement according to the voltage applied.

20 Claims, 6 Drawing Sheets

(51) Int. Cl.
*B03C 5/02* (2006.01)
*G01N 21/65* (2006.01)
(58) Field of Classification Search
CPC ..... B03C 5/022; B03C 2201/26; B82Y 30/00; B82Y 15/00; B82Y 40/00; G01J 3/4412
See application file for complete search history.

(56) References Cited

U.S. PATENT DOCUMENTS

| | | | | |
|---|---|---|---|---|
| 2016/0202123 A1 * | 7/2016 | Jung | ................... | B29C 33/3857 |
| | | | | 156/232 |
| 2023/0288341 A1 | 9/2023 | Park | | |

FOREIGN PATENT DOCUMENTS

| | | | | |
|---|---|---|---|---|
| KR | 102255110 B1 | 5/2021 | | |
| WO | WO-2020235702 A1 * | 11/2020 | ....... | G01N 33/54366 |

OTHER PUBLICATIONS

Sherman et al. "A surface-enhanced Raman spectroscopy database of 63 metabolites." Talanta vol. 210 (2020): 120645, doi: 10.1016/j.talanta.2019.120645 (Year: 2020).*

English Translation of Park WO-2020/235702-A1 Description (Year: 2020).*

Lee, Minji et al, Dielectrophoresis for Control of Particle Transport: Theory, Electrode Designs and Applications. Korean Chemical Engineering Research, Jan. 22, 2019, vol. 57, No. 2, pp. 149-163.

Ertsgaard Christopher T. et al: "Integrated Nanogap Platform for Sub-Volt Dielectrophoretic Trapping and Real-Time Raman Imaging of Biological Nanoparticles", Nano Letters,Mar. 11, 2020American Chemical Society, US, vol. 18, No. 9, Aug. 2, 2018 (Aug. 2, 2018), pp. 5946-5953, XP055853928, ISSN: 1530-6984, DOI: 10.1021/acs.nanolett.8b02654 Retrieved from the Internet: URL:https://pubs.acs.org/doi/pdf/10.1021/acs.nanolett.8b02654>.

Sherman Lindy M et al: "A surface-enhanced Raman spectroscopy database of 63 metabolites", Talanta, Elsevier, Amsterdam, NL, vol. 210, Dec. 17, 2019 (Dec. 17, 2019), XP086010097, ISSN: 0039-9140, DOI: 10.1016/J.TALANTA.2019.120645 [retrieved on Dec. 17, 2019].

Cheng I-Fang et al: "A dielectrophoretic chip with a roughened metal surface for on-chip surface-enhanced Raman scattering analysis of bacteria", Biomicrofluidics, vol. 4, No. 3, Aug. 5, 2010 (Aug. 5, 2010), XP093253782, US ISSN: 1932-1058, DOI: 10.1063/1.3474638 Retrieved from the Internet: URL:https://pmc.ncbi.nlm.nih.gov/articles/PMC2929256/pdf/BIOMGB-000004-034104_1.pdf>.

Zhao Zhi-Jun et al: "Adhesive-Layer-Free and Double-Faced Nanotransfer Lithography for a Flexible Large-Area MetaSurface Hologram", Applied Materials & Interfaces, vol. 12, No. 1, Dec. 11, 2019 (Dec. 11, 2019), pp. 1737-1745, XP093253814, US ISSN: 1944-8244, DOI: 10.1021/acsami.9b14345.

Hwang Soon Hyoung et al: "Repeatable and metal-independent nanotransfer printing based on metal oxidation for plasmonic color filters", Nanoscale, vol. 11, No. 23, Jun. 13, 2019 (Jun. 13, 2019) , pp. 11128-11137, XP093253817, United Kingdom ISSN: 2040-3364, DOI: 10.1039/C9NR00176J.

Ge Tingting et al: "Nanowire assisted repeatable DEP-SERS detection in microfluidics", Nanotechnology, vol. 30, Sep. 10, 2019 (Sep. 10, 2019), p. 475202, XP093253787, Bristol, GB ISSN: 0957-4484, DOI: 10.1088/1361-6528/ab3dc1 Retrieved from the Internet: URL:https://bmphys.cqu.edu.cn/paper/Geting ting_2019.pdf>.

Extended European Search Report dated Mar. 18, 2025 for EP Application No. 22896090.2 (11 pgs.).

* cited by examiner

FIG. 5A

Printing of 1st nanowires

Printing of 2nd nanowires

Multi-stacked nanowire

SERS hot spots

DIELECTROPHORESIS-BASED DYNAMIC SERS NANOELEMENT FOR CLASSIFICATION AND ANALYSIS OF METABOLITES

CROSS-REFERENCE TO RELATED APPLICATIONS

This application is a U.S. National Stage Application of PCT Application Serial No. PCT/KR2022/018187, filed Nov. 17, 2022, which claims priority to Korean Patent Application No. 10-2021-0158871, filed Nov. 17, 2021, the disclosures of which are incorporated herein by reference in their entireties.

TECHNICAL FIELD

The following example embodiments of the present invention relate to a dielectrophoresis-based dynamic Surface-Enhanced Raman Spectroscopy (SERS) nanoelement for classifying and analyzing metabolites, and more particularly, to a dielectrophoresis-based dynamic SERS nanoelement for classifying and analyzing metabolites through voltage regulation using a dynamic SERS nanoelement formed as an array.

BACKGROUND

Cancer is the number one cause of death in Korea. Here, lung cancer accounts for 35% and pancreatic cancer 11%. 5-year survival rates for lung cancer and pancreatic cancer remain at 25% and 10%, respectively, and have common characteristics in that early diagnosis is difficult and metastasis is easy. In the case of pancreatic cancer, the survival rate exceeds 50% when detected and operated on in a first stage. The survival rate of lung cancer in a first stage is 80% or more. However, in the case of early cancer, most are asymptomatic, so early detection is extremely difficult.

Since the pancreas is hidden by other organs, it is difficult to detect early pancreatic cancer with abdominal ultrasonography. Also, it is difficult to detect early lung cancer with plain chest X-ray. Abdominal CT is a relatively precise diagnostic technique, but it is difficult to perform extensively in the asymptomatic general population due to an increase in cancer incidence by radiation exposure.

Meanwhile, in the case of a tumor marker blood test, blood collection is required and predictiveness by one or two markers is insufficient. Therefore, it is necessary to develop new diagnostic technology that is noninvasive and has excellent sensitivity and specificity.

Korean Patent Registration NO. 10-1761010 describes a nano-transfer printing method and technology related to a SERS substrate, a SERS vial, and a SERS patch manufactured using the same.

SUMMARY

Technical Subject

Example embodiments of the present invention provide a dielectrophoresis-based dynamic Surface-Enhanced Raman Spectroscopy (SERS) nanoelement for classification and analysis of metabolites that may perform an electric potential control, may manufacture an array-type dynamic SERS nanoelement capable of amplifying and measuring an optical Raman signal, may measure a SERS signal by separating metabolites into individual components according to a potential application condition, and may perform an early diagnosis of disease quickly and noninvasively.

Also, example embodiments of the present invention provide a dielectrophoresis-based dynamic SERS nanoelement for classification and analysis of metabolites that may classify and adsorb various metabolites in urine on the surface through voltage regulation using an array-type dynamic SERS nanoelement and may provide a strong scattering enhancement effect that is constant at each location, reducing a cumbersome metabolite extraction time and quickly acquiring a unique signal of analyte.

Solution

A metabolite analysis method using a dielectrophoresis-based dynamic Surface-Enhanced Raman Spectroscopy (SERS) nanoelement according to an example embodiment of the present invention may include preparing a dynamic SERS nanoelement in which a surface area is formed as an array; applying voltage to the dynamic SERS nanoelement; and classifying metabolites of a subject to be analyzed by area by controlling polarity of the dynamic SERS nanoelement according to voltage application.

Here, the metabolite analysis method may further include measuring and analyzing a SERS signal by classifying the metabolites by area.

The preparation of the dynamic SERS nanoelement may include transferring a first layer of a metal nanowire array to a substrate; and printing a second layer of the metal nanowire array on the first layer at a predetermined alignment angle. The metal nanowire array may form a multi-stacked three-dimensional (3D) cross-wire nanostructure by forming a plurality of layers through continuous printing.

The dynamic SERS nanoelement may be adjusted for the number of layers of a metal nanowire array through fusion of KrF lithography and nano transfer printing.

The dynamic SERS nanoelement may amplify a Raman signal of the metabolite when adjusted for a distance and a thickness between metal nanowires and transferred on an arbitrary surface in a predetermined size, thereby providing an array-type device.

The classifying of the metabolites by area may include selectively adsorbing metabolites in urine that is the subject to be analyzed on the dynamic SERS nanoelement for each area.

The classifying of the metabolites by area may include separating and measuring the metabolites in trace concertation through amplification of an optical Raman signal.

The classifying of the metabolites by area may include selectively adsorbing metabolites having different polarity for each area by applying voltage to the surface of a plasmonic structure.

A dielectrophoresis-based dynamic SERS nanoelement according to another example embodiment of the present invention may include a surface portion of a dynamic SERS nanoelement in which a surface area is formed as an array. In response to voltage being applied to the dynamic SERS nanoelement, metabolites of a subject to be analyzed may be classified by area by controlling polarity of the dynamic SERS nanoelement.

Here, a SERS signal may be measured and analyzed by classifying the metabolites by area.

In the dynamic SERS nanoelement, and a first layer of a metal nanowire array may be transferred to a substrate and a second layer of the metal nanowire array may be printed on the first layer at a predetermined alignment angle. The metal nanowire array may form a multi-stacked three-dimensional (3D) cross-wire nanostructure by forming a plurality of layers through continuous printing.

The surface portion of the dynamic SERS nanoelement may adjust the number of layers of a metal nanowire array through fusion of KrF lithography and nano transfer printing.

The surface portion of the dynamic SERS nanoelement may amplify a Raman signal of the metabolite when adjusted for a distance and a thickness between metal nanowires and transferred on an arbitrary surface in a predetermined size, thereby providing an array-type device.

The surface portion of the dynamic SERS nanoelement may selectively adsorb metabolites in urine that is the subject to be analyzed on the dynamic SERS nanoelement.

The surface portion of the dynamic SERS nanoelement may separate and measure the metabolites in trace concertation through amplification of an optical Raman signal.

The surface portion of the dynamic SERS nanoelement may selectively adsorb metabolites having different polarity for each area by applying voltage to the surface of a plasmonic structure.

Effect

Also, according to example embodiments of the present invention, it is possible to provide a dielectrophoresis-based dynamic Surface-Enhanced Raman Spectroscopy (SERS) nanoelement for classification and analysis of metabolites that may perform an electric potential control, may manufacture an array-type dynamic SERS nanoelement capable of amplifying and measuring an optical Raman signal, may measure a SERS signal by separating metabolites into individual components according to a potential application condition, and may perform an early diagnosis of disease quickly and noninvasively.

Also, according to example embodiments of the present invention, it is possible to provide a dielectrophoresis-based dynamic SERS nanoelement for classification and analysis of metabolites that may classify and adsorb various metabolites in the urine on the surface through voltage regulation using an array-type dynamic SERS nanoelement and may provide a strong scattering enhancement effect that is constant at each location, reducing a cumbersome metabolite extraction time and quickly acquiring a unique signal of analyte.

BRIEF DESCRIPTION OF DRAWINGS

FIGS. 5A and 5B illustrates a manufacturing method of a dynamic SERS nanoelement according to an example embodiment of the present invention.

DETAILED DESCRIPTION

Figure 1:
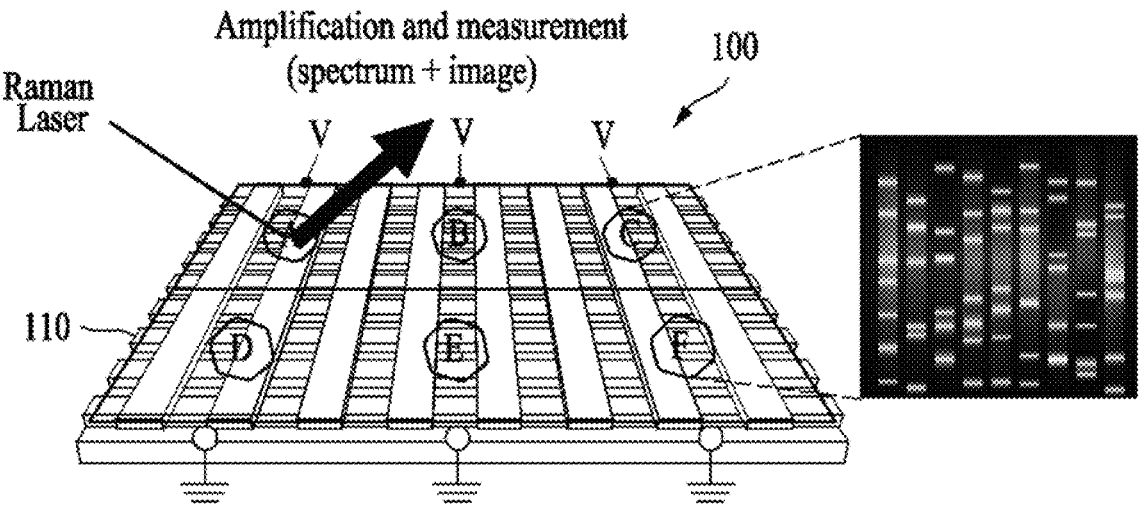
FIG. 1 schematically illustrates a dielectrophoresis-based dynamic Surface-Enhanced Raman Spectroscopy (SERS) nanoelement according to an example embodiment of the present invention.

Hereinafter, example embodiments of the present invention will be described with reference to the accompanying drawings. However, various modifications may be made to the example embodiments and the scope of the present invention is not limited to the following example embodiments. Also, various example embodiments are provided to more fully explain the present invention to one of ordinary skill in the art. Shapes and sizes of components in the drawings may be exaggerated for clarity of description.

Although technology for selecting and quickly quantifying a specific component in the mixture is most required in the field of environmental/food hazard determination and medical diagnosis, technology that satisfies speed, selectivity, and low cost is still under development. Example embodiments of the present invention provide a dynamic Surface-Enhanced Raman Spectroscopy (SERS) nanoelement that may solve such fundamental issues and be used immediately in the field and, based thereon, may apply noninvasive and rapid disease diagnosis technology.

A metabolite refers to a substance produced when a body dissolves food, drugs, chemicals, or its own tissue (fat or muscle) through a process of metabolism. The metabolite is usually a monomolecular substance and contained in large numbers in blood, exhaled breath, and urine.

Cancer cells target rapid proliferation and thus, their metabolic process and metabolites are partially different from those of normal cells. Therefore, early cancer diagnosis technology may be provided by using a difference in metabolites.

The existing studies on metabolites mainly use equipment, such as nuclear magnetic resonance (NMR), chromatography (GC/LC), and mass spectrometer (MS), for component separation and quantification, but they are expensive and require a relatively long measurement time.

Surface-Enhanced Raman Spectroscopy (SERS) refers to technology that amplifies a low Raman signal to enable analysis of low-concentration materials. The SERS measures Raman signals inherent in molecules, has excellent sensitivity and speed through optical amplification using a plasmonic nanostructure, and provides advantages, such as portability and non-destructiveness, using a portable measurement device.

Since urine contains a large number of components, a complex spectrum in a superimposed form is measured. Although concentration is low, there is a probability of missing signals of important metabolites and accordingly, there is a need for development of a SERS device having a component separation function.

Example embodiments of the present invention relate to a dielectrophoresis-based dynamic SERS nanoelement for classification and analysis of metabolites and may perform an electric potential control, may manufacture an array-type dynamic SERS nanoelement chip capable of amplifying and measuring optical Raman signals using nanoscale microprocessing technology, and may measure and analyze SERS signals by separating metabolites in urine samples from a patient and a normal person into individual components according to a potential application condition. Therefore, pancreatic cancer and lung cancer may be practically diagnosed early.

FIG. 1 schematically illustrates a dielectrophoresis-based dynamic SERS nanoelement according to an example embodiment of the present invention.

Referring to FIG. 1, a dynamic SERS nanoelement 100 according to example embodiments of the present invention is a nanoelement chip in which a surface area is formed as an array and capable of performing an individual potential control accordingly.

According to example embodiments, many types of metabolites having different polarity may be classified by area using the dynamic SERS nanoelement 100 and "separation and measurement" of metabolites in trace concentration may be performed through high-level optical amplification. For example, as voltage is applied to the dynamic SERS nanoelement 100, metabolites may be separated into an A area, a B area, a C area, a D area, an E area, and an F area on a surface portion 110 of the dynamic SERS nanoelement. Here, metabolites may be analyzed using a spectrum or an image by amplifying and measuring a Raman laser. According to example embodiments, it is possible to simultaneously satisfy a component separation function of GC/LC and excellent sensitivity, speed, and low cost of the dynamic SERS nanoelement 100.

The dynamic SERS nanoelement 100 implemented according to example embodiments of the present invention may separate metabolites at voltage ranging from −10 to +10 V. Here, an amplification ratio (Au-based device) of the dynamic SERS nanoelement 100 is 105 or more and urine sample-based diagnosis specificity and sensitivity for pancreatic cancer and lung cancer are 90% or more.

Hereinafter, the dielectrophoresis-based dynamic SERS nanoelement 100 according to an example embodiment is further described.

The dielectrophoresis-based dynamic SERS nanoelement 100 according to an example embodiment of the present invention may include the surface portion 110 of the dynamic SERS nanoelement in which a surface area of the dynamic SERS nanoelement 100 is formed as an array. In response to voltage being applied to the dynamic SERS nanoelement 100, metabolites of a subject to be analyzed may be classified by area by controlling polarity of the dynamic SERS nanoelement 100. Here, after classifying the metabolites by area, a SERS signal may be measured and analyzed through a Raman laser.

In the dynamic SERS nanoelement 100, a first layer of a metal nanowire array may be transferred to a substrate and a second layer of the metal nanowire array may be printed on the first layer at a predetermined alignment angle. For example, the second layer of the metal nanowire array may be printed on the first layer at an alignment angle of 90° to form a lattice structure. The metal nanowire array may form a multi-stacked three-dimensional (3D) cross-wire nanostructure by forming a plurality of layers through continuous printing.

The surface portion 110 of the dynamic SERS nanoelement may adjust be adjusted for the number of layers of a metal nanowire array through fusion of KrF lithography and nano transfer printing. Also, the surface portion 110 of the dynamic SERS nanoelement may amplify a Raman signal of the metabolite when adjusted for a distance and a thickness between metal nanowires and transferred on an arbitrary surface in a predetermined size, thereby providing an array-type device.

The surface portion 110 of the dynamic SERS nanoelement may selectively adsorb metabolites having different polarity for each area by applying voltage to the surface of a plasmonic structure. In particular, the surface portion 110 of the dynamic SERS nanoelement may selectively adsorb metabolites in urine that is the subject to be analyzed on the dynamic SERS nanoelement 100 for each area and may separate and measure the metabolites in trace concentration through amplification of an optical Raman signal.

Figure 2:
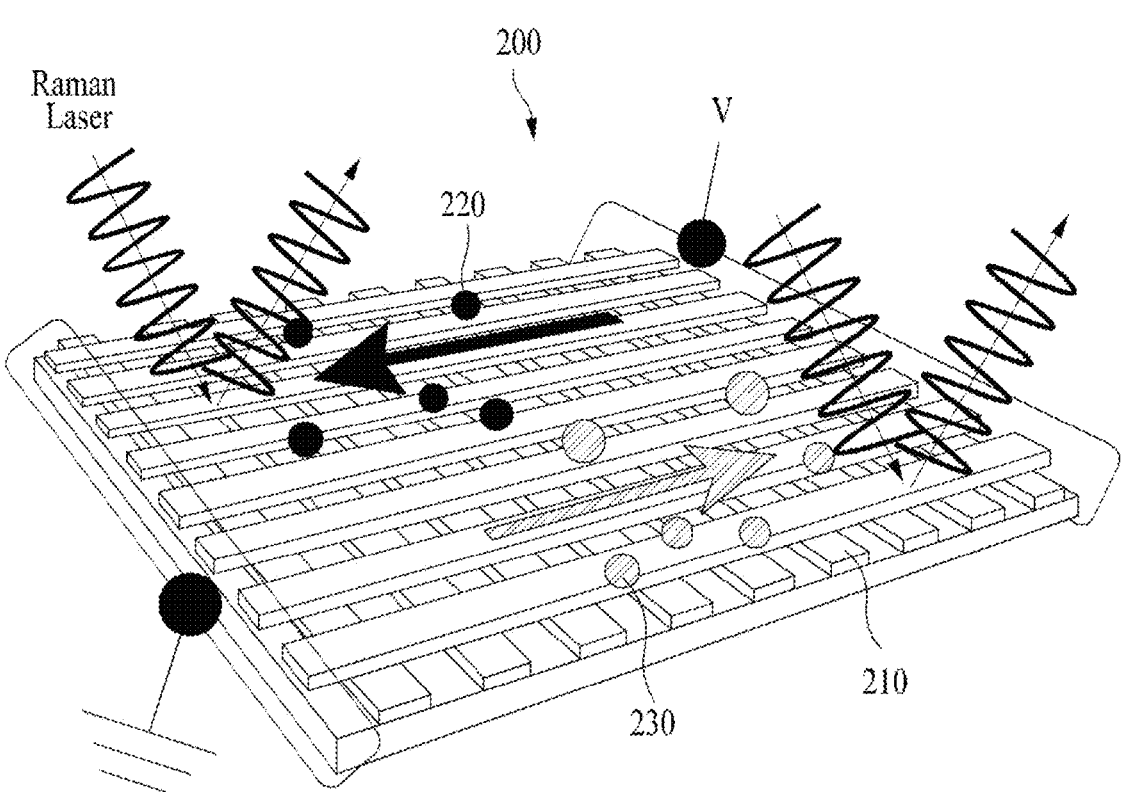
FIG. 2 illustrates an example of describing dielectrophoretic separation of a dielectrophoresis-based dynamic SERS nanoelement according to an example embodiment of the present invention.

FIG. 2 illustrates an example of describing dielectrophoretic separation of a dielectrophoresis-based dynamic SERS nanoelement according to an example embodiment of the present invention.

Referring to FIG. 2, in general, the dielectrophoretic separation easily proceeds at the level of proteins, DNA, and macromolecules, but needs to overcome a Brownian motion in the case of small molecules.

Metabolites 220 and 230 contain a large number of small molecules and a strong electric field is required. Therefore, a dielectrophoretic separation method of the small molecular metabolites 220 and 230 may design an electrode to maximize the electric field (E-field) in a dynamic SERS nanoelement 200 and may use micro semiconductor process technology. Here, since a surface portion 210 of the dynamic SERS nanoelement is formed as an array by forming a plurality of layers, the dynamic SERS nanoelement 200 may classify metabolites of a subject to be analyzed by area by controlling the polarity.

Figure 3:
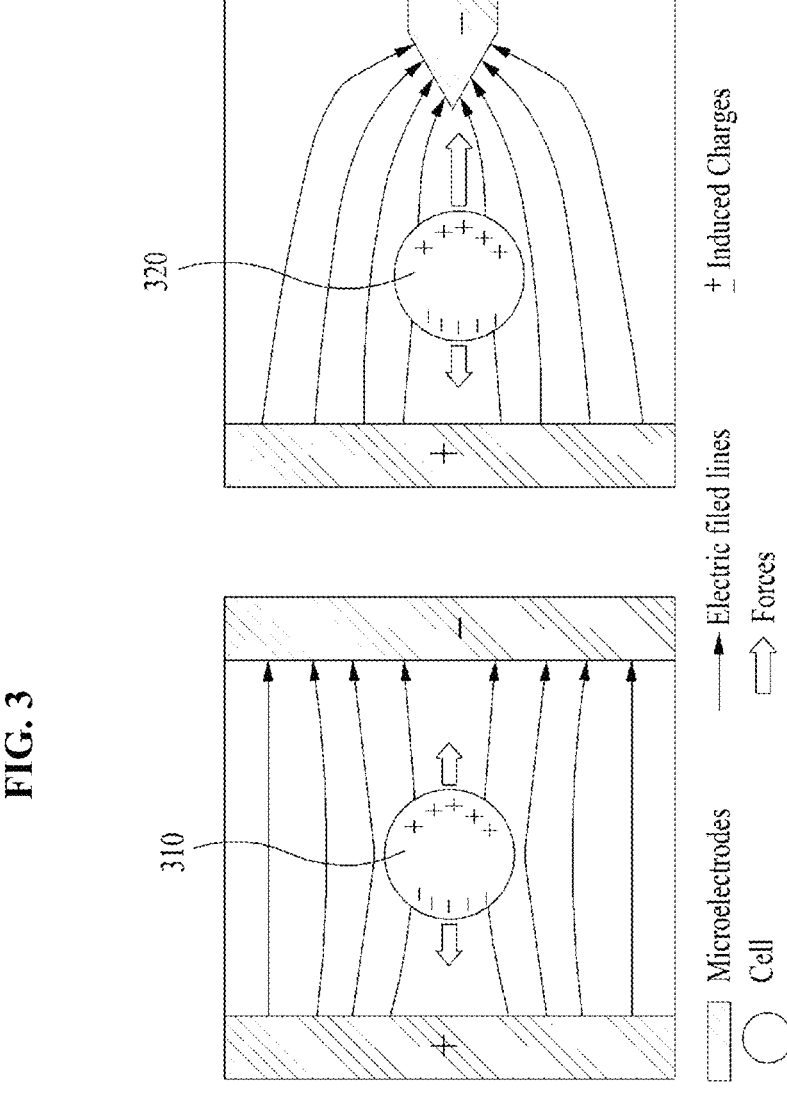
FIG. 3 illustrates an example of describing an electric potential control of a dielectrophoresis-based dynamic SERS nanoelement according to an example embodiment of the present invention.

FIG. 3 illustrates an example of describing an electric potential control of a dielectrophoresis-based dynamic SERS nanoelement according to an example embodiment of the present invention.

Referring to FIG. 3, movement of cells 310 and 320 may be determined according to formed charges. As described above, in the case of small molecules, since Brownian motion needs to be overcome, an electrode may be designed to maximize the E-field. For example, the electrode may be designed as shown in (b) of FIG. 3.

Figure 4:
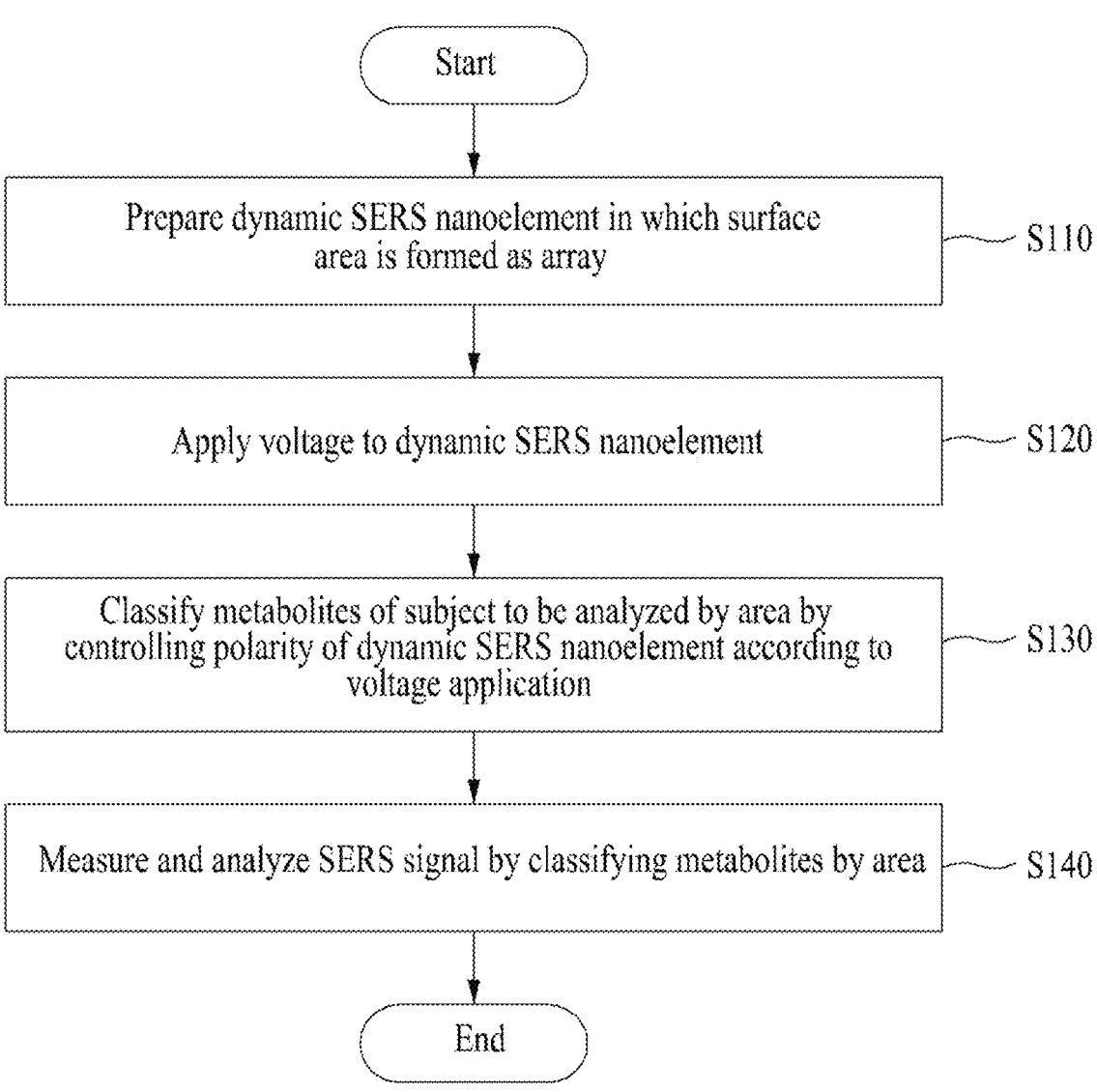
FIG. 4 is a flowchart illustrating a metabolite analysis method using a dielectrophoresis-based dynamic SERS nanoelement according to an example embodiment of the present invention.

FIG. 4 is a flowchart illustrating a metabolite analysis method using a dielectrophoresis-based dynamic SERS nanoelement according to an example embodiment of the present invention.

Referring to FIG. 4, a metabolite analysis method using a dielectrophoresis-based dynamic SERS nanoelement according to an example embodiment of the present invention may include operation S110 of preparing a dynamic SERS nanoelement in which a surface area is formed as an array; operation S120 of applying voltage to the dynamic SERS nanoelement; and operation S130 of classifying metabolites of a subject to be analyzed by area by controlling polarity of the dynamic SERS nanoelement according to voltage application.

Here, the metabolite analysis method may further include operation S140 of measuring and analyzing a SERS signal by classifying the metabolites by area.

Hereinafter, the metabolite analysis method using the dielectrophoresis-based dynamic SERS nanoelement according to an example embodiment of the present invention is further described. Meanwhile, the metabolite analysis method using the dielectrophoresis-based dynamic SERS nanoelement may be performed by a metabolite analysis device using the dielectrophoresis-based dynamic SERS nanoelement.

In operation S110, the dynamic SERS nanoelement in which the surface area is formed as the array may be prepared.

For example, the dynamic SERS nanoelement may be configured by transferring a first layer of a metal nanowire array to a substrate and by printing a second layer of the metal nanowire array on the first layer at a predetermined alignment angle. The metal nanowire array may form a multi-stacked 3D cross-wire nanostructure by forming a plurality of layers through continuous printing. Here, the second layer of the metal nanowire array may be printed on the first layer at an alignment angle of 90° to form a lattice structure.

For example, in the case of preparing the dynamic SERS nanoelement formed as the array including three layers, the dynamic SERS nanoelement may be configured by including transferring the first layer of the metal nanowire array to the substrate, printing the second layer of the metal nanowire array on the first layer at the alignment angle of 90° to form the lattice structure, and then printing a third layer of the metal nanowire array on the second layer at the alignment angle of 90° to form the lattice structure. Using this method, the dynamic SERS nanoelement may form the multi-stacked 3D cross-wire nanostructure.

Also, the dynamic SERS nanoelement may be adjusted for the number of layers of the metal nanowire array through fusion of KrF lithography and nano transfer printing.

The dynamic SERS nanoelement may amplify a Raman signal of the metabolite by adjusting a distance and a thickness between metal nanowires and may transfer the same on an arbitrary surface in a predetermined size, thereby providing an array-type device.

In operation S120, the voltage may be applied to the dynamic SERS nanoelement. Meanwhile, in the case of metabolites, since a large number of small molecules are contained, a strong E-field is required and accordingly, an electrode may be designed to maximize the E-field and dielectrophoretic separation of small molecular metabolites may be performed using micro semiconductor processing technology.

In operation S130, the metabolites of the subject to be analyzed may be classified by area by controlling the polarity of the dynamic SERS nanoelement according to the voltage application.

Metabolites having different polarity may be selectively adsorbed for each area by applying voltage to the surface of a plasmonic structure. In particular, metabolites in urine that is the subject to be analyzed on the dynamic SERS nanoelement may be selectively adsorbed for each area.

In operation S140, the SERS signal may be measured and analyzed by classifying the metabolites by area. According to example embodiments, metabolites in trace concentration may be separated and measured through amplification of an optical Raman signal.

Figure 5A:
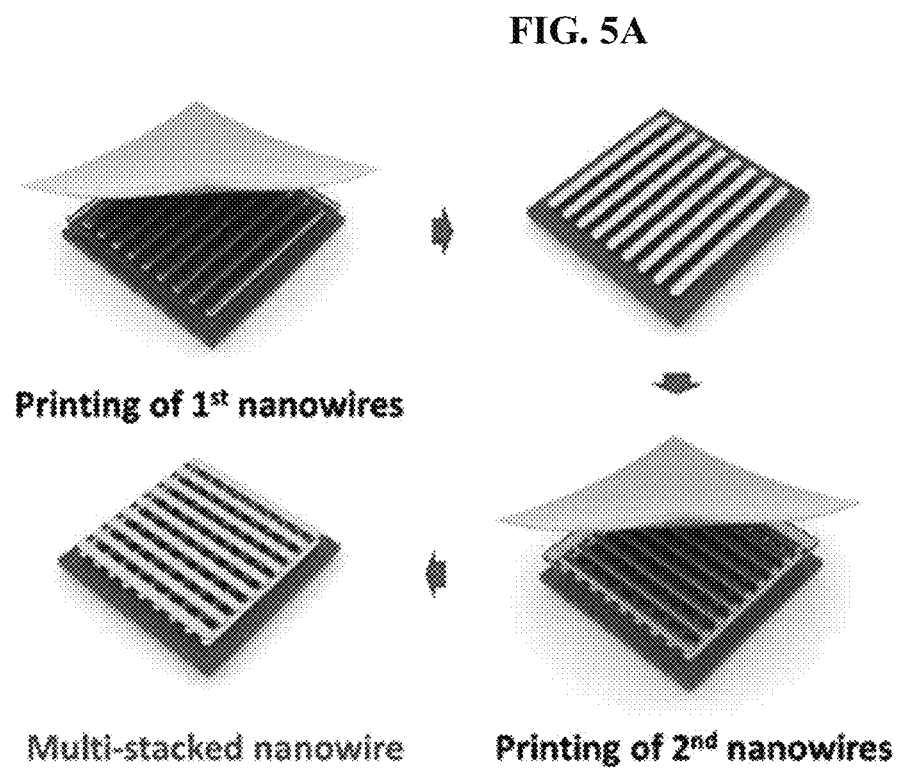
Figure 5B:
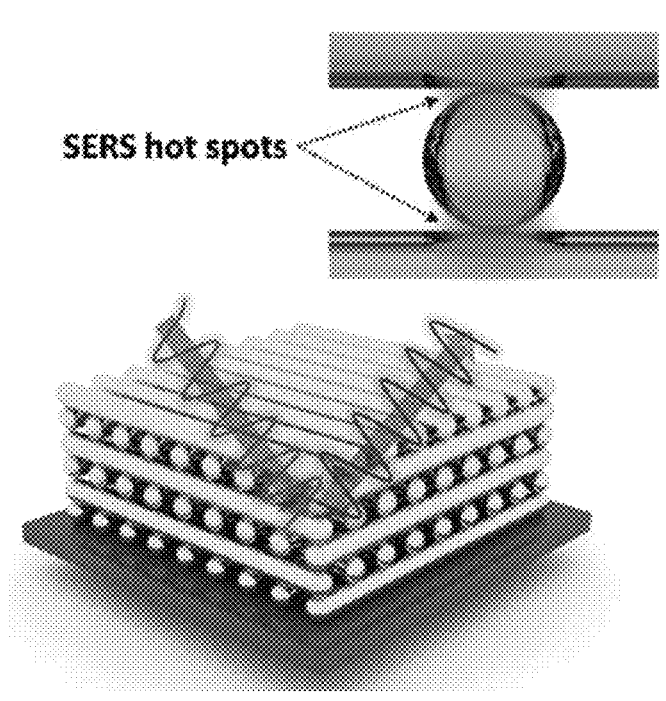

FIGS. 5A and 5B illustrates a manufacturing method of a dynamic SERS nanoelement according to an example embodiment of the present invention.

Referring to FIGS. 5A and 5B, it is possible to provide a dynamic SERS nanoelement adjustable for the number of layers using nano-transfer printing and having a constantly high degree of signal amplification.

A manufacturing method of a dynamic SERS nanoelement according to an example embodiment may be performed through a sequential nano-transfer printing process (solvent-vapor-injection nano-transfer printing (S-nTP)).

A first layer of a metal (e.g., Au) nanowire array is transferred to a Si substrate and a second layer is printed on the first layer at an alignment angle of 90°. Through continuous printing of the nanowire array, a multi-stacked 3D cross-wire structure of various layers may be manufactured.

As a result of testing intensity of Raman spectrum of a subject to be analyzed, a linear increase up to a predetermined stacking level may be verified. As a result of dropping the same subject to be analyzed on the multi-stacked metal nanostructure, a SERS signal increases with increasing layers, which may provide a much higher enhanced signal for a multi-layer structure than for a two-dimensional (2D) array.

The development of an array-type dynamic SERS device requires 1) semiconductor nano-processing technology for maintaining high signal amplification sensitivity over a large area and generating a uniformly dense structure and 2) SERS nanoelement development technology according to purpose using the same.

A highly sensitive SERS nanoelement using 1) the semiconductor nano-processing technology may be provided.

According to an example embodiment, there may be provided an ultra-high-density, highly sensitive SERS process technology and device that may readily adjust the number of layers of a metal nanowire array through fusion of Krf lithography, directed self-assembly, and nano-transfer printing. This nanostructure may be useful for development of an array-type device since it is possible to amplify a Raman signal of a metabolite and transfer the same to an arbitrary surface in a predetermined size by adjusting a distance and a thickness between wires.

2) The SERS nanoelement may be modified and applied according to an analyte.

Quantification may be performed by attaching an aptamer to a substrate made using nano-transfer printing technology and by simultaneously and selectively adsorbing and measuring bisphenol A, tetracycline, and diclofenac that are contaminants in water without labeling. Also, using carboxylic acid functionalization and graphitic layer coating on the substrate, a structural change and quantification of tau protein and amyloid β that are representative biomarkers of Alzheimer's disease may be succeeded.

As described above, the plasmonic surface according to an example embodiment is advantageous in comparing a difference in samples between a normal person and a cancer patient since a high scattering enhancement sensitivity may be constantly maintained over a large area and analytes in urine are classified and adsorbed.

Hereinafter, for example, an S-nTP process is described in detail.

The S-nTP process may include a continuous process of two stages. A first process (S-nTP 1 process) refers to a process of coating a polymer thin film on a template substrate on which a surface pattern is formed, manufacturing the polymer thin film into a replica thin film mold using the polymer thin film and adhesive film, and then forming a nanostructure on the replica thin film mold.

Here, a concavo-convex surface pattern may be formed on the template substate using a pattern process including at least one of photolithography, block copolymer self-assembly-based lithography, and E-beam lithography and a reactive ion etching (RIE) process.

For example, a SERS device manufacturing system may allow the surface pattern to have a concavo-convex shape by forming the surface pattern with a predetermined size on the template substrate using the patterning process and then performing surface etching through the RIE process. In detail, for example, the SERS device manufacturing system may manufacture the template substrate through the patterning process of the block copolymer self-assembly-based lithography on a silicon wafer, to form an ultra-fine surface pattern of 20 nm or less.

The SERS device manufacturing system may coat a polymer thin film by applying the polymer thin film on the template substrate using at least one process among spin coating, deep coating, and spray coating. Here, polymer applied as the polymer thin film may have a solubility parameter of $20 \text{ MPa}^{1/2}$ to $40 \text{ MPa}^{1/2}$ and may have a glass transition temperature higher than 25° C. at room temperature. Therefore, polymer may stably maintain a solid state at room temperature.

Also, the SERS device manufacturing system may form the polymer thin film by applying a single-layered thin film or may form the polymer thin film as a multi-stacked thin film by sequentially applying a first thin film and a second thin film. Further description related thereto is made with reference to FIGS. 3A and 3B.

The SERS device manufacturing system may form a nanostructure by depositing a functional material on the replica thin film mold using a tilt deposition method.

Once the above first process is completed, the SERS device manufacturing system performs a second process (S-nTP 2 process) of selectively weakening adhesive forces between the adhesive film and the replica thin film mold and then transferring nanostructures to a target object.

Here, to reduce separation energy between interfaces, the SERS device manufacturing system may selectively weaken adhesive forces between the adhesive film and the replica thin film mold by inserting organic solvent vapor between the adhesive film and the replica thin film mold.

The S-nTP 2 process may differently apply a method of transferring nanostructures to a target object according to a method of providing organic solvent vapor. For example, the S-nTP 2 process may include respectively different transfer processes according to a first method using a polymer pad containing an organic solvent and a second method using a liquid organic solvent.

According to the first method of the S-nTP 2 process, the SERS device manufacturing system may provide the organic solvent vapor by making the polymer pad containing the organic solvent in contact with the replica thin film mold. For example, the SERS device manufacturing system may make the polymer pad in contact with the adhesive film and the replica thin film mold in which nanostructures are formed for a preset period of time (e.g., 10 seconds to 60 seconds) such that the nanostructures come into contact with the polymer pad.

Here, the polymer pad, as a pad that expands by adsorbing the organic solvent or a flat polydimethylsiloxane (PDMS) pad with a thickness of 0.5 cm to 2 cm, may be manufactured by placing the mixture of a precursor and a curing agent on the silicon wafer and then heating the same and separating the same after cross-linking. Here, the polymer pad may be formed using cross-linked polymer having a solubility parameter of 20 $MPa^{1/2}$ to 40 $MPa^{1/2}$ according to a type of the organic solvent. The organic solvent to be adsorbed by the polymer pad may have a solubility parameter similar to a solubility parameter of the polymer thin film constituting the replica thin film mold and/or a solubility parameter of the adhesive film within a preset range. Also, as the organic solvent, a single solvent or two or more component solvents may be used.

The organic solvent vapor provided through contact between the polymer pad and the replica thin film mold is injected between the adhesive film and the replica thin film mold and weakens adhesive forces between the adhesive film and the replica thin film mold. When this process is performed, the SERS device manufacturing system may separate the replica thin film mold and the adhesive film from the polymer pad, such that the nanostructures remain in the polymer pad. Here, the SERS device manufacturing system may separate the adhesive film from the replica thin film mold in contact with the polymer pad and then remove the replica thin film mold in contact with the polymer pad using the organic solvent.

For example, the SERS device manufacturing system may separate only the contact film after making the replica thin film mold and the adhesive film come into contact with the nanostructures and the polymer pad. Then, the SERS device manufacturing system may remove the replica thin film mold from the polymer pad by rinsing the replica thin film mold using an organic solvent, such as toluene, acetone, and IPA solvent, such that only the nanostructures remain in the polymer pad or by depositing the polymer pad in contact with the replica thin film mold in the organic solvent.

Therefore, the polymer pad in which the nanostructures remain may be transferred to the target object. For example, the SERS device manufacturing system may make the polymer pad in which the nanostructures remain in contact with the target object (e.g., for 1 seconds to 5 seconds) such that the nanostructures and the target object come into contact and may separate the polymer pad from the target object such that the nanostructures may be transferred to the target object.

On the other hand, according to the second method of the S-nTP 2 process, the SERS device manufacturing system may provide organic solvent vapor that is vaporized from the liquid organic solvent. For example, the SERS device manufacturing system may weaken adhesive forces between the adhesive film and the replica thin film mold by injecting, between the adhesive film and the replica thin film mold in a sealed chamber, the organic solvent vapor that is vaporized from the liquid organic solvent having a solubility parameter similar to a solubility parameter of the adhesive film and a solubility parameter of the polymer thin film constituting the replica thin film mold within the preset range.

When the above process is performed, the SERS device manufacturing system may make the replica thin film in which the nanostructures are formed and the adhesive film in contact with the target object (e.g., for 1 seconds to 5 seconds) such that the nanostructures come into contact with the target object. Then, the SERS device manufacturing system may separate the replica thin film and the adhesive film from the target object such that the nanostructures may be transferred to the target object.

For example, the SERS device manufacturing system may make the replica thin film mold and the adhesive film come into contact such that the nanostructures and the target object come into contact with each other and then separate only the adhesive film and may remove the replica thin film mold in contact with the target object using the organic solvent. In detail, for example, the SERS device manufacturing system may remove the replica thin film mold from the target object by rinsing the replica thin film mold using the organic solvent or by depositing the target object in contact with the replica thin film mold into the organic solvent.

Through the aforementioned S-nTP 1 process and 2 process, the nanostructure of a metal material, such as Au, Ag, Cu, Ni, Pt, Cr, Co, or Pd, may be formed and a metal nanowire array may be printed on the target object and accordingly, a SERS device used for analyzing a component of a material may be manufactured.

The existing SERS devices refer to a passive-type device that optically amplifies and detects a material physically adsorbed on the surface without a function of selecting a subject to be analyzed according to a physical property. The present invention first proposed the concept of selectively adsorbing metabolites for each area by applying voltage to the surface of a plasmonic structure and by controlling the polarity. Also, since a signal amplification amount for each measurement point is constant, high sensitivity is maintained when analyzing a signal of another analyte for each area. On the contrary, the existing SERS device has difficulty in maintaining consistently high conductivity and signal amplification properties since nanostructures are randomly arranged or nanoparticles need to be densely gathered on a large surface.

The existing SERS device selectively adsorbs and analyzes a desired analyte by attaching biomaterial that combines with a specific material, such as antibody and aptamer, to an element. This also facilitates placement of the analyte closer to a hot spot of a nanostructure, helping to acquire a constant and distinct signal from the target analyte. However, this analytical approach limits types of analytes and may limit the ability to obtain important information on various materials in body fluids. Example embodiments of the present invention are to separate and analyze a large number of metabolites in various areas through voltage application in an unfiltered urine sample, which is an innovative concept that a disease diagnosis may be performed without being limited to a specific biomarker. Also, according to example embodiments of the present invention, it is possible to provide a nanoelement capable of performing rapid discrimination and quantification for individual components without performing conventional GC or LC analysis, which consumes relatively large cost and time.

Also, as a biomarker for disease diagnosis, metabolites are most recently actively studied compared to genomes and proteomes and correlation with diseases are continuously being revealed. In particular, metabolites are secreted as final expression of cellular metabolism in the body and thus, may best reflect biochemical phenotype at a time of detection and accordingly, a metabolite-based cancer diagnosis probability is emerging. However, metabolite analysis-based disease diagnosis research is being conducted only by a small number of research teams compared to genomes and proteomics of the existing analysis methods and has not yet been used for clinical diagnosis.

Metabolite analysis has been studied using mass spectrometry, such as GC-MS, LC-MS, and the like. This detection method uses a relatively long period of time for physical separation and has a low sensitivity at the ppm~ppb level. Also, many calibration processes are required for quantification.

An electrical sensor configured to measure resistance that varies when exposed to metabolites is difficult to analyze multiple detections and to define which molecule among many materials has caused a signal. Due to influence of surrounding components and moisture, a non-specific signal and a background signal are high.

In terms of clinical cancer diagnosis, the existing technology may confirm cancer only through invasive biopsy and a biomarker test excluding biopsy has remarkably low accuracy, sensitivity, and specificity, making early diagnosis difficult. Also, analysis cost is high and an analysis expert is required. On the contrary, the example embodiments of the present invention relate to a noninvasive test and may greatly increase sensitivity and specificity and are expected to enable the early diagnosis in an early cancer development process. In addition, a low-cost and user-friendly interface is possible.

Also, in terms of metabolite detection methods, the mass spectrometry of the existing technology has a difficult analysis condition, requires a relatively long time, has a low sensitivity, and has difficulty in defining a specific molecule with an electronic sensor. On the contrary, the example embodiments of the present invention may perform a label-free multi-detection through rapid separation and adsorption, and may short analysis time and ppt to ppq level of sensitivity, and may infer molecules by analyzing a specific signal.

As described above, according to example embodiments, it is possible to classify and adsorb various metabolites in urine on the surface through voltage regulation using a dynamic SERS chip formed as an array and to provide a strong scattering enhancement effect that is constant for each location, reducing a cumbersome metabolite extraction time and quickly acquiring a unique signal of analyte.

Meanwhile, although an interference signal is present in solution itself, it is possible to perform accurate measurement, analysis, and diagnosis by distinguishing a minute signal difference for each metabolite using unique deep learning technology. This nanoelement-based new platform may expand to universal early diagnosis technology by using other body fluids, such as blood and sweat, as well as metabolites in urine in the future.

Metabolite-based clinical translational studies may be applied in a short period of time through rapid and high sensitivity detection of metabolites. Unlike conventional mass spectrometry, example embodiments may construct a diagnostic platform to a user-friendly interface, thereby maximizing the range of users and increasing an early diagnosis rate.

A low-cost/noninvasive novel early diagnosis method based on a SERS array device may greatly contribute to increasing a survival rate through early treatment through early detection of pancreatic cancer and lung cancer and, in the case of prostate cancer, may be an alternate test method of a PSA test having a high false positive rate and may reduce burden on a patient, such as unnecessary biopsy.

When it is mentioned that one component is "connected" or "accessed" to another component, it may be understood that the one component is directly connected or accessed to another component or that still other component is present between the two components. In addition, it should be noted that if it is described that one component is "directly connected" or "directly accessed" to another component, still other component may not be present therebetween.

The terms used herein are used for the purpose of describing particular example embodiments only and are not to be limiting of the present invention. The singular forms "a," "an," and "the" are intended to include the plural forms as well, unless the context clearly indicates otherwise. It will be further understood that the terms "comprises/comprising" or "having." when used in the specification, specify the presence of stated features, integers, steps, operations, elements, components, or combination thereof, but do not preclude presence or addition of one or more other features, integers, steps, operations, elements, components, or combination thereof.

Terms, such as first, second, and the like, may be used to describe various components, but the components should not be limited by the terms. The components are used merely to distinguish one component from other component(s).

Also, terms, such as "~ unit," and "~ module," and the like, present a unit for processing at least one function or operation, which may be implemented through hardware, software, or combination of hardware and software.

Also, a component of an example embodiment described with reference to the respective drawings is not limitedly applied to only the corresponding example embodiment and may be implemented to be included in other example embodiments without departing from the technical spirit of the present invention. Also, although separate description is omitted, it will be apparent that a plurality of example embodiments may be implemented into a single integrated example embodiment.

Also, describing with reference to the accompanying drawings, like reference numerals refer to like elements through and repeated description related thereto is omitted. When it is determined that detailed description related to the known art makes the present invention unnecessarily ambiguous in describing the present invention, the detailed description is omitted.

Although the example embodiments are described with reference to limited example embodiments and drawings, it is apparent to one of ordinary skill in the art that various modifications and changes may be made from the description. For example, suitable results may be achieved if the described techniques are performed in a different order, and/or if components in a described system, architecture, device, or circuit are combined in a different manner and/or replaced or supplemented by other components or equivalents Therefore, other implementations, other example embodiments, the scope of the claims, and their equivalents are to be construed as being included in the invention.

What is claimed is:

1. A metabolite analysis method using a dielectrophoresis-based dynamic Surface-Enhanced Raman Spectroscopy (SERS) nanoelement, the metabolite analysis method comprising:
  preparing a dynamic SERS nanoelement in which a surface area is formed as a metal nanowire array having a plurality of areas with different numbers of layers, distances or thicknesses of nanowires;
  applying a voltage to the dynamic SERS nanoelement; and
  selectively absorbing metabolites of a subject to be analyzed for each area by controlling a polarity of the dynamic SERS nanoelement according to the voltage applied;
  wherein selectively absorbing the metabolites for each area comprises separating and measuring the metabolites at trace concentrations through amplification of an optical Raman signal, an amplification ratio of the dynamic SERS nanoelement being $10^5$ or more; and
  wherein the dynamic SERS nanoelement is manufactured through a continuous two-stage solvent-vapor-injection nano-transfer printing (S-nTP) process.

2. The metabolite analysis method of claim 1, further comprising:
  measuring and analyzing a SERS signal of the selectively absorbed metabolites for each area.

3. The metabolite analysis method of claim 1, wherein the preparing of the dynamic SERS nanoelement comprises:
  transferring a first layer of the metal nanowire array to a substrate; and
  printing a second layer of the metal nanowire array on the first layer at a predetermined alignment angle,
  wherein the metal nanowire array forms a multi-stacked three-dimensional (3D) cross-wire nanostructure by forming the plurality of layers through continuous printing.

4. The metabolite analysis method of claim 1, wherein preparing the dynamic SERS nanoelement comprises adjusting the number of layers of the metal nanowire array through a fusion of KrF lithography and nano transfer printing for the plurality of areas of the array.

5. The metabolite analysis method of claim 1, further comprising amplifying the optical Raman signal of the metabolite by adjusting a distance between and a thickness of metal nanowires of the metal nanowire array and transferring the metal nanowire array onto an arbitrary surface in a predetermined size, for the plurality of areas of the array.

6. The metabolite analysis method of claim 1, wherein selectively absorbing the metabolites for each area comprises selectively adsorbing metabolites in urine that is the subject to be analyzed on the dynamic SERS nanoelement for each area.

7. The metabolite analysis method of claim 1, wherein selectively absorbing the metabolites for each area comprises selectively adsorbing metabolites having a different polarity for each area by applying the voltage to a surface of a plasmonic structure.

8. A dielectrophoresis-based dynamic Surface-Enhanced Raman Spectroscopy (SERS) nanoelement comprising:
  a surface portion in which a surface area is formed as a metal nanowire array having a plurality of areas with different numbers of layers, distances, or thicknesses of nanowires,
  wherein, in response to a voltage being applied to the dynamic SERS nanoelement, metabolites of a subject to be analyzed are selectively absorbed for each area by controlling a polarity of the dynamic SERS nanoelement;
  wherein the surface portion of the dynamic SERS nanoelement is capable of separating and measuring trace concentrations of the metabolite through amplification of an optical Raman signal, an amplification ratio of the dynamic SERS nanoelement being $10^5$ or more; and
  wherein the dynamic SERS nanoelement is manufactured through a continuous two-stage solvent-vapor-injection nano-transfer printing (S-nTP) process.

9. The dynamic SERS nanoelement of claim 8, wherein a SERS signal is measured and analyzed of the selectively absorbed metabolites for each area.

10. The dynamic SERS nanoelement of claim 8, wherein, in the dynamic SERS nanoelement, a first layer of the metal nanowire array is transferred to a substrate, and a second layer of the metal nanowire array is printed on the first layer at a predetermined alignment angle, and the metal nanowire array forms a multi-stacked three-dimensional (3D) cross-wire nanostructure by forming the plurality of layers through continuous printing.

11. The dynamic SERS nanoelement of claim 8, wherein the dynamic SERS nanoelement is prepared by adjusting the number of the layers of the metal nanowire array through a fusion of KrF lithography and nano transfer printing for the plurality of areas of the array.

12. The dynamic SERS nanoelement of claim 8, wherein the surface portion of the dynamic SERS nanoelement is configured to amplify the optical Raman signal of the metabolite when a distance between and a thickness of metal nanowires of the metal nanowire array are adjusted and transferred onto an arbitrary surface in a predetermined size, for the plurality of areas of the array.

13. The dynamic SERS nanoelement of claim 8, wherein the surface portion of the dynamic SERS nanoelement is configured to selectively adsorb metabolites in urine that is the subject to be analyzed on the dynamic SERS nanoelement.

14. The dynamic SERS nanoelement of claim 8, wherein the surface portion of the dynamic SERS nanoelement is configured to selectively adsorb metabolites having a different polarity for each area by applying the voltage to a surface of a plasmonic structure.

15. The metabolite analysis method of claim 1, wherein the voltage is between −10 V and +10 V.

16. The dynamic SERS nanoelement of claim 8, wherein the voltage is between −10 V and +10 V.

17. The metabolite analysis method of claim 1, wherein the method further comprises a dielectrophoretic separation method of the metabolites using an electrode designed to maximize an electric field in the dynamic SERS nanoelement performed by micro semiconductor process technology.

18. The dynamic SERS nanoelement of claim 8, wherein the dynamic SERS nanoelement uses an electrode designed to maximize an electric field in the dynamic SERS nanoelement performed by micro semiconductor process technology.

19. The metabolite analysis method of claim 6, wherein urine sample-based diagnosis specificity and sensitivity for pancreatic cancer and lung cancer are 90% or more.

20. The dynamic SERS nanoelement of claim 13, wherein urine sample-based diagnosis specificity and sensitivity for pancreatic cancer and lung cancer are 90% or more.

* * * * *